US006639741B2

(12) United States Patent
Wagner

(10) Patent No.: US 6,639,741 B2
(45) Date of Patent: Oct. 28, 2003

(54) PROJECTOR LENS HOLDER

(75) Inventor: Josef Wagner, Jicin (CZ)

(73) Assignee: Autopal s.r.o., Novy Jicin (CZ)

( * ) Notice: Subject to any disclaimer, the term of this patent is extended or adjusted under 35 U.S.C. 154(b) by 0 days.

(21) Appl. No.: 10/145,100

(22) Filed: May 15, 2002

(65) Prior Publication Data

US 2002/0171949 A1 Nov. 21, 2002

(51) Int. Cl.[7] .......................... G02B 7/02; G03B 17/26; G03B 21/14; F21V 17/00

(52) U.S. Cl. ....................... 359/819; 359/811; 359/820; 396/526; 362/455; 353/100

(58) Field of Search ................................ 359/819, 818, 359/809, 828, 820, 811; 396/526; 362/455; 353/100

(56) References Cited

U.S. PATENT DOCUMENTS 5,070,434 A * 12/1991 Suman et al. ............... 362/490
5,249,082 A * 9/1993 Newman .................... 359/813
5,299,066 A * 3/1994 Rombult ..................... 359/819

* cited by examiner

*Primary Examiner*—Hung Xuan Dang
*Assistant Examiner*—Joseph Martinez
(74) *Attorney, Agent, or Firm*—Birch, Stewart, Kolasch & Birch, LLP

(57) ABSTRACT

A holder (2) of projector lens (1) is provided with openings through which springs (3) pass. The shorter arm (4) of said spring (3) presses said lens (1) against said holder (2), the longer arm (5) is pressed to the circumferential mantle of said holder (2) and secured in this position by a bent cutout (7).

5 Claims, 1 Drawing Sheet

PROJECTOR LENS HOLDER

FIELD OF THE INVENTION

The present invention relates to an arrangement of parts for fastening a lens of a projector optical system of a headlamp, preferably for motor vehicles.

BACKGROUND OF THE INVENTION

The headlamp projector system, used in motor vehicles instead of a conventional paraboloidal mirror, comprises of an ellipsoidal reflector, a lens, and in case of the dim and fog lamps, also of a screen placed in the lens focus. Said main parts have to be mutually adjusted accurately and stably so that there is no change in optical characteristics of the headlamp in operation caused by light source heat, vibrations or ageing of the used materials. Therefore, mainly metallic parts are used to fix the projector lens. Such parts are not subject of the above mentioned influences. For example, flexible wire rings are used. The rings are leaned against the oblique walls or lens holder depressions and they press the lens into an opening of this holder. Frames resembling a bayonet closure are also used. They hold the lens via a spring to the firm part of the holder. Such design methods of fixing the lens meet the requirements of thermal and mechanical stability but they are demanding with regard to high accuracy and low tolerances of parts. Another disadvantage is the fact that the lens holder requires to be provided with cutouts, which cutouts are used to fix the flexible parts. But some light radiates through such cutouts of the circumferential casing of the holder. To prevent this light loss it is necessary to use non-translucent masks covering the lens holder. However, such mask represents an additional headlamp part.

SUMMARY OF THE INVENTION

The above mentioned disadvantages are substantially removed in case of a lens holder according to this invention. The holder body of cylindrical or conical shape is connected with an ellipsoidal reflector and eventually with a screen. On the light output side, a lens is inserted in the holder so that its spherical part passes through an opening in the holder face. The lens border is pressed by springs inserted in the openings formed in the circumferential mantle in the plane of the internal surface of the lens. The springs are provided with an enlarged end, which end prevents that they can be taken out of the opening in the holder. The longer end of the spring, which spring is bent into an L-shape, is pressed to the circumferential mantle of the holder and in this position it is secured by bending the foot cut out on the holder body or on the spring, eventually it is inserted into an opening in the screen border or in the reflector which reflector is connected with the lens holder.

It is an advantage of this invention that a sufficient force presses the lens to rest in the holder also in case of substantial tolerances of the lens border. Overlapping of the openings by the springs passing through prevents that light passes outside the lens and allows to utilize the holder also as an appearance forming part of the headlamp without any necessity to use a covering mask.

BRIEF DESCRIPTION OF THE DRAWINGS

The invention in its various aspects will now be described with reference to a drawing thereof, in which.

DETAILED DESCRIPTION OF THE INVENTION

Figure 1:
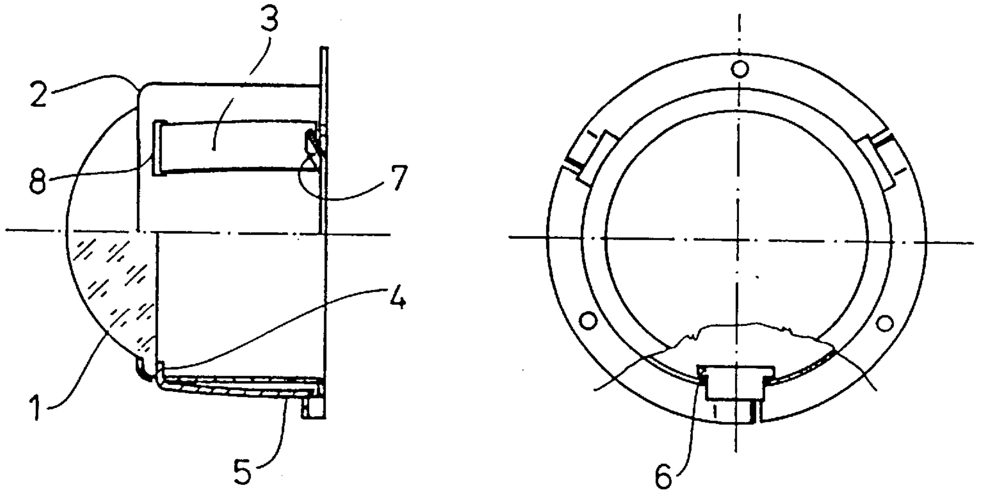
FIG. 1 is an embodiment of the lens holder with springs secured by a bent cutout at the holder border and FIGS. 2, 3 and 4 are alternative embodiments of fixing the spring to the holder body.

A lens 1 having its spherical part passing through an opening in the holder 2 is held by springs 3 passing through openings 8 in the holder 2. The shorter arm 4 of the spring 3, which presses the border of the lens 1 to the holder 2 is provided with an enlargement 6 preventing taking it out. The end 5 of the longer arm is pressing against the circumferential mantle of the holder 2 and is secured by a bent cutout 7 formed at the border of the holder 2.

Figure 2:
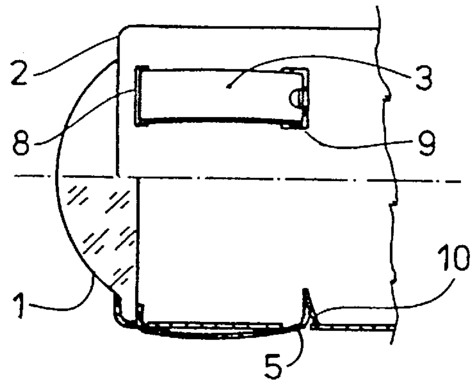

An alternative embodiment is shown in FIG. 2, where the longer arm of the spring 3 is bent into another opening 9 in the holder 2 and it is secured by a latch 10 cut out, which latch 10 is leaning against edge of the opening 9 from inside.

Figure 3:
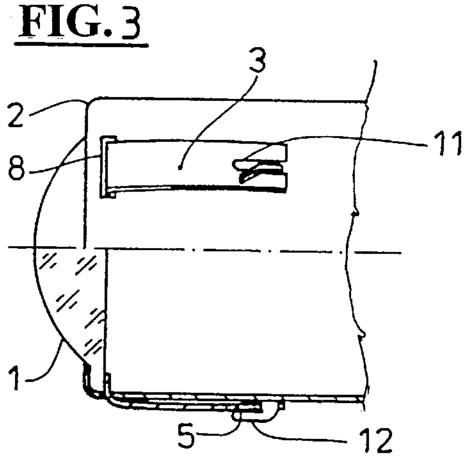

FIG. 3 shows an embodiment of the spring 3 with a longitudinal cutout 11, wherein the position is secured by turning the latch 12 which latch 12 is formed by cutting it out and bending it out of the circumferential mantle of the holder 2.

Figure 4:
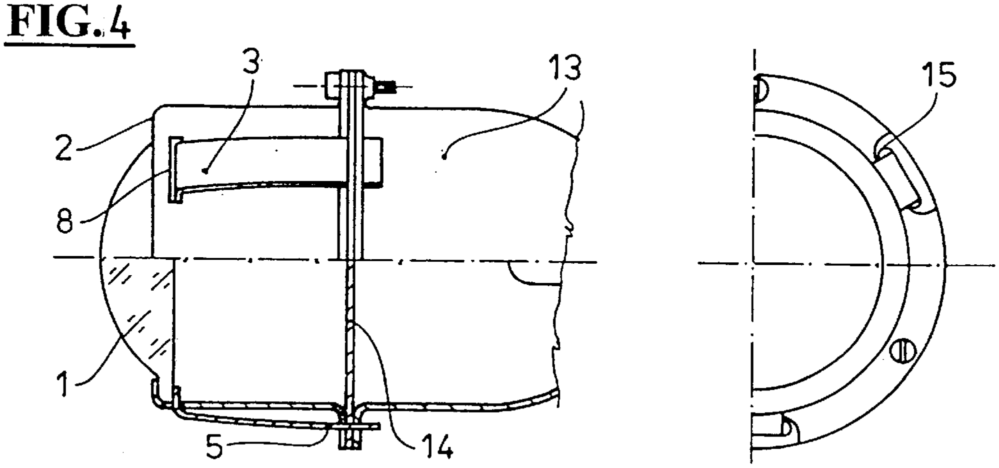

FIG. 4 shows an embodiment of the holder 2 of the lens 1, which holder 2 is connected with a lens 14 and a reflector 13, where securing of the end 5 of the longer arm of the spring 3 is carried out by inserting it into an opening 15, which opening 15 is formed in the border of the screen 14 or the reflector 13.

Industrial Use

The holder of projector lens according to this invention will find use in fastening a lens of an elliptically-dioptrical projection system, which system is used particularly in the motor vehicles lighting industry.

What is claimed is:

1. A projector lens holder comprised of a holder body of cylindrical or conical shape having a central opening having inserted therein lens for light output supported in said opening against the circumference of said internal border of the opening wherein raid lens (1) is fastened within the holder (2) by means of at least two independent springs (3) that are inserted into openings (8) formed within a circumferential mantle of said holder (2), wherein an arm (4) of said spring inserted into said opening (8) is provided with an enlarged end (6) which presses a circumferential shoulder of said lens (1) against the internal border of said opening in said holder (2) and opposing end (5) of said arm of said spring (3) is pressed against said circumferential mantel of said holder (2) and is fixed in said position.

2. A projector lens holder of claim 1 wherein said opposing end (5) of said arm of said spring (3) is held in place by engagement with a bent cutout (7) formed in the border of said holder (2).

3. A projector lens holder of claim 1 wherein said opposing end (5) of said arm of said spring (3) includes an L-shaped portion which passes through an opening (9) into said holder (2) and on which a latch (10) is formed which latch (10) is forced against an edge of said opening (9) from inside.

4. A projector lens holder of claim 1 wherein said opposing end (5) of said arm of said spring (3) includes a cutout formed through which a foot is passed which foot is cut out in and bent out of the circumferential mantle of said holder (2), wherein said spring is secured by said foot (12) being turned.

5. A projector lens holder of claim 1 wherein said spring (3) is secured in a position pressed against the circumferential mantle of said holder (2) by inserting said opposing end (5) of the arm in an opening (15) which opening (15) is formed in the edge of a screen (14) or the border of an ellipsoid reflector (13) and said screen or reflector are firmly connected to said holder (2) of said lens (1).

* * * * *